United States Patent
Iwamura et al.

(10) Patent No.: US 8,170,548 B2
(45) Date of Patent: May 1, 2012

(54) USER EQUIPMENT TERMINAL AND RADIO COMMUNICATION SYSTEM

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 38 days.

(21) Appl. No.: 12/672,944

(22) PCT Filed: Aug. 15, 2008

(86) PCT No.: PCT/JP2008/064637
§ 371 (c)(1), (2), (4) Date: May 4, 2010

(87) PCT Pub. No.: WO2009/025241
PCT Pub. Date: Feb. 26, 2009

(65) Prior Publication Data
US 2011/0070888 A1 Mar. 24, 2011

(30) Foreign Application Priority Data
Aug. 17, 2007 (JP) .................................. 2007-213148

(51) Int. Cl.
*H04W 4/00* (2009.01)
(52) U.S. Cl. ................ 455/432.1; 455/435.2; 455/435.3; 455/62; 455/166.2; 455/446; 455/453
(58) Field of Classification Search ............... 455/432.1, 455/435.2, 435.3, 62, 166.2, 446, 453
See application file for complete search history.

(56) References Cited

U.S. PATENT DOCUMENTS
2007/0184863 A1 8/2007 Takagi et al.
2008/0254812 A1* 10/2008 Kitazoe ...................... 455/456.2

FOREIGN PATENT DOCUMENTS
| | | |
|---|---|---|
| JP | 10-023503 A | 1/1998 |
| JP | 2002-112302 A | 4/2002 |
| JP | 2006-087084 A | 3/2006 |
| JP | 2006-217525 A | 8/2006 |
| JP | 2007-043754 A | 2/2007 |
| KR | 100726656 | 6/2007 |
| WO | 2005/083909 A1 | 9/2005 |

OTHER PUBLICATIONS
NEC, "UE specific intra E-UTRAN (inter-frequency) and inter-RATcell reselection," R2-072757, Jun. 2, 2007, XP050135535, 5 pages.
T-Mobile, "Load Sharing Using Cell Reselection," R2-061238, May 3, 2006, XP050131184, 6 pages.
Nokia Siemens Networks et al., "Mobility uses cases based onm the access pipe concept," R2-072388, Jun. 19, 2007, XP050135232, 6 pages.

(Continued)

*Primary Examiner* — Justin Lee
(74) *Attorney, Agent, or Firm* — Osha • Liang LLP

(57) ABSTRACT

A user equipment terminal for selecting a standby cell based on a specified priority of cell selection includes a determining unit configured to receive a signal transmitted from a base station apparatus and determine whether priority information of cell selection is included in the signal; and a cell selecting unit configured to perform, based on the determination result by the determining unit, cell selection with a same priority for each cell, when the priority information is not included.

4 Claims, 11 Drawing Sheets

OTHER PUBLICATIONS

Extended European Search Report for Application No. 08827577.1 mailed Apr. 21, 2011 (11 pages).
Canadian Office Action for Canadian Application No. 2,695,885, mailed on Mar. 31, 2011 (2 pages).
International Search Report w/translation from PCT/JP2008/064637 dated Nov. 11, 2008 (4 pages).
Written Opinion from PCT/JP2008/064637 dated Nov. 11, 2008 (4 pages).
3GPP TSG-RAN4 Meeting #43bis, R4-071118; "E-UTRA Cell Selection and Cell Reselection Aspects"; Orlando, USA; Jun. 25-29, 2007 (5 pages).
3GPP TS 36.214 V1.0.0; "Physical layer—Measurements"; May 2007 (8 pages).
3GPP TS 25.304 V7.2.0; "User Equipment (UE) procedures in idle mode and procedures for cell reselection in connected mode"; Jun. 2007 (41 pages).
3GPP TS 36.304 V0.0.0; "Evolved Universal Terrestrial Radio Access (E-UTRA) User Equipment (UE) procedures in idle mode"; Jun. 2007 (17 pages).
European Examination Report for Application No. 08827577.1 mailed Nov. 3, 2011 (7 pages).
NTT DoCoMo, et al., "Load Balancing Solutions for LTE", 3GPP TSG RAN WG2 #58bis, R2-072719, Orlando, USA Jun. 25-29, 2007.

* cited by examiner

USER EQUIPMENT TERMINAL AND RADIO COMMUNICATION SYSTEM

TECHNICAL FIELD

The present invention relates to an LTE (Long Term Evolution) system, and specifically relates to a user equipment terminal and a radio communication system.

BACKGROUND ART

In a radio communication network, the location of a user equipment terminal is stored in the network on a tracking area basis. The tracking area corresponds to a location area (LA) or a routing area (RA) in the third generation (3G) system and includes one or more cells.

An identifier of an access gateway apparatus for managing each user equipment terminal is maintained by a home location register (HLR).

A user equipment terminal has two operational modes; one is an active mode and the other is an idle mode.

The user equipment terminal in the idle mode (i.e., in a standby status) selects a cell with the best propagation condition and receives a paging channel transmitted in the cell. After the user equipment terminal checks the received paging channel, determines the presence or absence of a flag indicating an incoming call to the user equipment terminal, and identifies the flag indicating the incoming call to the user equipment terminal, the user equipment terminal accesses the cell within which the user equipment terminal is situated in uplink. Then, the user equipment terminal establishes a connection in the cell and changes to the active mode. At this moment, the network (network nodes) can identify the cell within which the user equipment terminal is situated.

Since there is no connection between the network (network node) and the user equipment terminal while the user equipment terminal is in the idle mode, the network (network nodes) cannot identify the cell within which the user equipment terminal is situated. For this reason, the network (network nodes) transmits the paging channel in all the cells included in the tracking area.

In each tracking area, an identifier of the tracking area is broadcast in each cell. The user equipment terminal in the idle mode receives the broadcast identifier of the tracking area and recognizes the tracking area to which the user equipment terminal belongs.

For example, when the user equipment terminal moves to an adjacent cell and the identifier of the tracking area which is broadcast in the adjacent cell is different from the previously broadcast identifier of the tracking area, the user equipment terminal accesses the adjacent cell in uplink and requests an update of the tracking area. The update of the tracking area is referred to as a tracking area update (TAU).

Specifically, the user equipment terminal maintains the identifier of the tracking area with which the location of the user equipment terminal is associated. The user equipment terminal reselects a cell as it moves. Reselecting of the cell is referred to as cell reselection. Each time the user equipment terminal performs cell reselection, the user equipment terminal receives broadcast information in the cell and checks the identifier of the tracking area included in the broadcast information. When the received identifier of the tracking area is different from the maintained identifier of the tracking area, the user equipment terminal determines that the user equipment terminal has moved out of the tracking area within which the user equipment terminal has been situated, and then performs a tracking area update.

On the other hand, when the received identifier of the tracking area is the same as the maintained identifier of the tracking area, the user equipment terminal determines that the user equipment terminal has not moved out of the tracking area within which the user equipment terminal has been situated. In this case, the user equipment terminal does not perform a tracking area update.

Although the user equipment terminal performs cell reselection as it moves, the user equipment terminal does not perform a tracking area update as long as the user equipment terminal is situated within the same tracking area.

Further, the user equipment terminal in the active mode (i.e., the user equipment terminal in communication) does not perform a tracking area update.

As described above, the tracking area includes one or more cells. Among these cells, a set of cells included in the same band (frequency band) is referred to as a frequency layer. Each frequency layer includes one or more cells.

For example, as shown in FIG. 1, one or more cells are included in a tracking area. In the tracking area, frequency layers F1, F2, and F3 are provided. In each frequency layer, at least one carrier (cell) is provided. For example, in the frequency layer F1, two carriers (cells) f.A1 and f.A2 are provided. In the frequency layer F2, three carriers (cells) f.B1, f.B2, and f.B3 are provided. In the frequency layer F3, three carriers (cells) f.C1, f.C2, and f.C3 are provided. Different frequency bands are used in the respective frequency layers. Further, different radio access technologies (RATs) may also be used in the respective frequency layers. For example, the frequency layers F1 and F2 may correspond to the LTE system and the frequency layer F3 may correspond to the UMTS (Universal Mobile Telecommunications System).

The user equipment terminal is situated within one of the plural cells included in the frequency layers. The network (network node) can transmit priority information indicating the frequency layer to be used and specify a priority of the frequency layer in which the user equipment terminal should be situated. For example, when the priority of the frequency layer F1 is specified to be high, the user equipment terminal is situated in the frequency layer F1 as long as the user equipment terminal is within the coverage of the frequency layer F1.

DISCLOSURE OF INVENTION

Problem(s) to be Solved by the Invention

As described above, when the user equipment terminal moves to an adjacent cell and the tracking area in which the adjacent cell is included is different from the tracking area within which the user equipment terminal has been situated, the user equipment terminal performs a tracking area update.

An MME (mobility management entity) associates the tracking area with the user equipment terminal based on the tracking area update transmitted from the user equipment terminal. The MME transmits the ID of the tracking area associated with the user equipment terminal as a tracking area update acceptance message called a tracking area update accept (TAU accept). It is proposed that the tracking area update accept include frequency information and RAT priority information in addition to the ID of the tracking area (see 3GPP R4-071118, June 2007, for example).

In this case, when the user equipment terminal receives a tracking area update accept, the user equipment terminal is operable to be situated within a cell included in the frequency layer with a high priority according to the RAT priority information included in the tracking area update accept. The priority information is maintained until a next tracking area update. Alternatively, the period of time during which the priority information is maintained may be specified in advance. In this case, the lapse of time may be detected by a timer, for example.

In some situations, the network (network node) may release a priority of selecting a standby cell (a cell within which a user equipment terminal is to be in the standby mode). In other words, the network (network node) may allow for cell selection without specifying a priority. In this case, it is possible to transmit priority information having the same priority in all the cells. However, a problem arises in that the amount of information for releasing the priority may grow.

In view of the problem in the related art, it is a general object of the present invention to provide a user equipment terminal and a radio communication system capable of reducing the amount of information for releasing a priority of selecting a standby cell.

In addition, it is another object of the present invention to provide a user equipment terminal and a radio communication system capable of setting a priority of selecting a standby cell.

Means for Solving the Problem(s)

In one aspect of the present invention, there is provided a user equipment terminal for selecting a standby cell based on a specified priority of cell selection, including:
a determining unit configured to receive a signal transmitted from a base station apparatus and determine whether priority information of cell selection is included in the signal; and
a cell selecting unit configured to perform, based on the determination result by the determining unit, cell selection with a same priority for each cell, when the priority information is not included.

In another aspect of the present invention, there is provided a radio communication system including a user equipment terminal for selecting a standby cell based on a priority of cell selection specified by an upper node, wherein
the upper node includes
a priority setting unit configured to set a priority for the user equipment terminal to set the priority of selecting the standby cell; and
a transmitting unit configured to transmit, in response to a tracking area update request from the user equipment terminal, a tracking area update accept including priority information set by the priority setting unit; and
the user equipment terminal includes
a determining unit configured to determine whether the priority information of cell selection is included in the tracking area update accept; and
a cell selecting unit configured to perform, based on the determination result by the determining unit, cell selection with a same priority for each cell, when the priority information is not included.

In another aspect of the present invention, there is provided a radio communication system including a user equipment terminal for selecting a standby cell based on a priority of cell selection specified by a base station apparatus, wherein
the base station apparatus includes
a priority setting unit configured to set a priority for the user equipment terminal to set the priority of selecting the standby cell; and a transmitting unit configured to transmit an RRC release request including priority information set by the priority setting unit; and
the user equipment terminal includes
a determining unit configured to determine whether the priority information of cell selection is included in the RRC release request; and
a cell selecting unit configured to select, based on the determination result by the determining unit, the standby cell with a same priority for each cell, when the priority information is not included.

In another aspect of the present invention, there is provided a user equipment terminal for selecting a standby cell based on a specified priority of cell selection, including:
a determining unit configured to receive a signal transmitted from a base station apparatus and determine whether priority information of cell selection is included in the signal; and
a cell selecting unit configured to perform, based on the determination result by the determining unit, cell selection according to the priority information, when the priority information is included.

In another aspect of the present invention, there is provided a radio communication system including a user equipment terminal for selecting a standby cell based on a priority of cell selection specified by a base station apparatus, wherein
the base station apparatus includes
a priority setting unit configured to set a priority for the user equipment terminal to set the priority of selecting the standby cell; and
a transmitting unit configured to transmit an RRC connection release message including priority information set by the priority setting unit; and
the user equipment terminal includes
a determining unit configured to determine whether the priority information of cell selection is included in the RRC connection release message; and
a cell selecting unit configured to perform, based on the determination result by the determining unit, cell selection according to the priority information, when the priority information is included.

Advantageous Effect of the Invention

A user equipment terminal and a mobile communication system according to one embodiment of the present invention can reduce the amount of information for releasing a priority of selecting a standby cell.

A user equipment terminal and a mobile communication system according to another embodiment of the present invention can set a priority of selecting a standby cell.

DETAILED DESCRIPTION OF THE PREFERRED EMBODIMENTS

Figure 1:
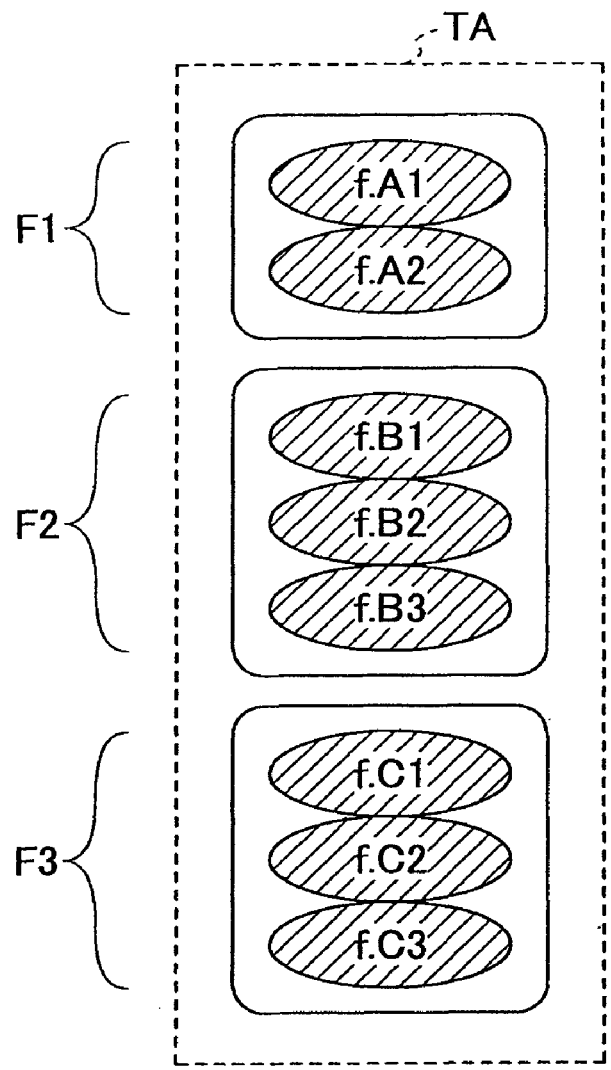
FIG. 1 shows a conceptual diagram illustrating frequency layers.
Figure 1:
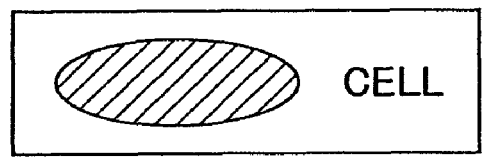

[Description of Notations]
$100_1, 100_2, 100_3, \ldots, 100_n$ user equipment terminal
102 RF circuit
104 broadcast channel receiving unit
106 control plane processing unit
108 user plane processing unit
110 user I/F
112 reception quality measuring unit
114 serving cell reception quality measuring unit
116 neighbor cell reception quality measuring unit
118 threshold determining unit
120 control unit
122 cell selecting unit
$200_1, 200_2, 200_3, \ldots, 200_l$ base station apparatus
$202_1, 202_2, 202_3, \ldots, 202_i$ cell
300 access gateway apparatus
400 core network

BEST MODE OF CARRYING OUT THE INVENTION

A best mode for carrying out the present invention is described below with reference to the accompanying drawings. Throughout the figures for illustrating the embodiments of the present invention, the same reference numerals are used for the same or equivalent elements and their repeated descriptions may be omitted.

First, a radio communication system including a user equipment terminal in accordance with an embodiment of the present invention is described with reference to FIG. 2. While an LTE (Long Term Evolution) system is used as an example in the embodiment, the present invention is also applicable to a UMTS (Universal Mobile Telephone Service) system such as a W-CDMA (Wideband Code Division Multiple Access) system and an HSDPA (High Speed Downlink Packet Access) system. In general, the present invention is applicable to any radio communication system in which a network (network node) transmits information corresponding to a priority about selection of a cell (standby cell) within which a user equipment terminal is to be in the standby mode, and cell selection is performed according to the priority.

The radio communication system 1000, which may be an Evolved UTRA and UTRAN system (also as known as LTE (Long Term Evolution) system or a Super 3G system, includes base station apparatuses (eNB: eNodeB) 200 ($200_1$, $200_2, \ldots, 200_l$; 'l' is an integer greater than zero) and plural user equipment terminals (UE: User Equipment) $100_n$ ($100_1$, $100_2, \ldots, 100_n$; 'n' is an integer greater than zero). The base station apparatus $200_l$ is connected to an upper node such as an access gateway apparatus 300. The upper node 300 is connected to a core network 400. The user equipment terminal $100_n$ communicates with the base station apparatus $200_l$ according to the Evolved UTRA and UTRAN scheme within cells $202_i$ ($202_1, 202_2, 202_3, \ldots, 202_i$; 'l' is an integer greater than zero) covered by the corresponding base station apparatuses $200_l$.

Each of the user equipment terminal ($100_1$, $100_2$, $100_3, \ldots, 100_n$) has the same configuration, functions, and status. Therefore, unless otherwise described, the term user equipment terminal $100_n$ may be collectively used in the following descriptions. For convenience of explanation, mobile stations are in radio communication with the base station apparatus $200_l$. In general, mobile terminals and fixed terminals may be in communication with the base station apparatus $200_l$.

As a radio access scheme in the radio communication system 1000, an OFDM (Orthogonal Frequency Division Multiplexing) scheme and an SC-FDMA (Single-Carrier Frequency Division Multiplexing Access) scheme are used in downlink and uplink communications, respectively. The OFDM scheme is a transmission scheme in which a frequency band is divided into plural sub-carriers having narrow frequency bands and data are transmitted on the respective sub-carriers. The SC-FDMA scheme is a transmission scheme in which a frequency band is divided so that different frequencies can be used among plural terminals and as a result, interference between terminals can be reduced.

The access gateway apparatus (aGW: access Gateway) 300 may be included in the core network 400 or any other network. The access gateway apparatus 300 may be divided into a control plane (C-plane) and a user plane (U-plane) to take the form of an MME/UPE (Mobility Management Entity/User Plane Entity). The core network 400 includes a home location register (HLR) (not shown). The home location register maintains the identifier of the access gateway apparatus for managing the user equipment terminals $100_n$.

The radio communication system in accordance with a first embodiment is described below.

In the radio communication system in accordance with the first embodiment, the user equipment terminal $100_n$ in the idle status transmits a tracking area update (TAU). When the user equipment terminal $100_n$ receives a tracking area update accept (TAU accept; hereinafter referred to as a TAUA) and the TAUA does not include priority information, priority information which has been maintained by the user equipment terminal $100_n$ is discarded. In other words, the user equipment terminal $100_n$ sets all the priorities of frequency layers to the same priority. As a result, the user equipment terminal $100_n$ selects one or more cells included in the frequency layers with the same priority.

When the user equipment terminal $100_n$ subsequently moves to another tracking area and priority information is specified in the tracking area, the network (network node) specifies the priority information by means of a TAUA.

The priority is specified for the purpose of load balancing. For example, assuming that plural frequency layers are provided or assuming that cells are included in each frequency layer, when many user equipment terminals belong to a certain frequency layer or a certain cell, communications are intensively carried out in the certain frequency layer or the certain cell regardless of availability in other frequency layers or other cells. As a result, communication quality may be degraded. For example, in FIG. 1, when many user equipment terminals are in the standby status in the frequency layer F1 (many user equipment terminal are waiting for calls in the frequency layer F1) and a user equipment terminal enters into the tracking area including the frequency layer F1, communication quality in the frequency layer F1 may be degraded if the priority of the frequency layer F1 is higher than the priorities of the frequency layers F2 and F3. In this case, it is preferable that the TAUA be transmitted including priority information of the frequency layer F1 with a lower priority than the priorities of frequency layers F2 and F3.

Further, the LTE system includes cells with different transmission bands. It is preferable that the network (network node) allow the user equipment terminal $100_n$ to select a cell with a wider band rather than a cell with a narrower band. In order to allow the user equipment terminal $100_n$ to select the cell with the wider band, priority information is specified.

Further, a data transmission service may be provided in the frequency layers F1 and F2 and a voice service may be provided in the frequency layer F3. In this case, it is preferable that the network (network node) allow the user equipment terminal $100_n$ using the voice service to be in the standby status in the frequency layer F3 in which the voice service is provided. In order to allow the user equipment terminal $100_n$ to be in the standby status in the frequency layer F3, priority information is specified.

When the same service is provided in each frequency layer, priority information is specified for the purpose of load balancing.

When the priority information has been specified for the purpose of load balancing and then the loads in the frequency layers are balanced after a predetermined time, the priority information need not be specified.

Figure 3:
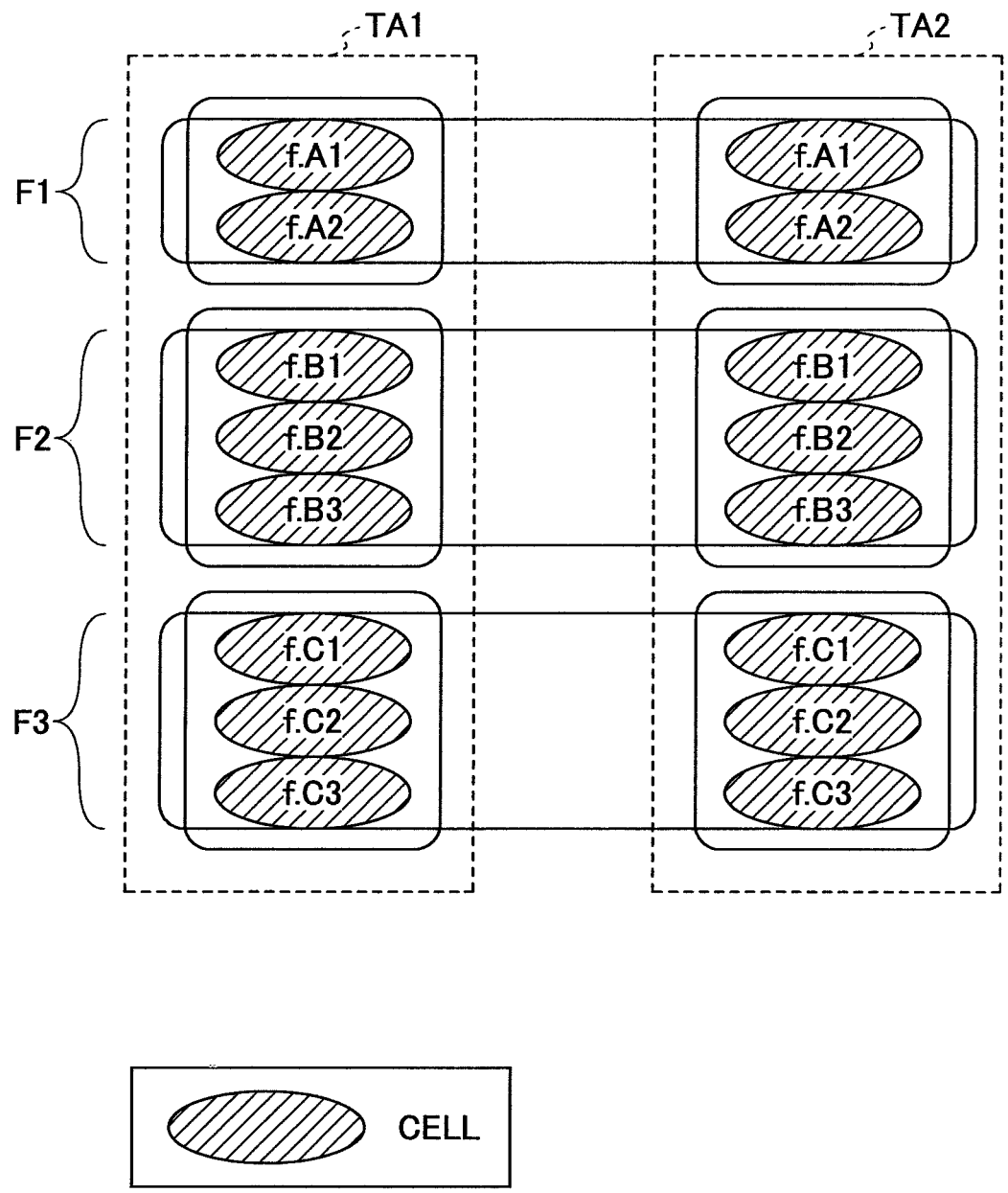
FIG. 3 shows a conceptual diagram illustrating priorities.

For example, as shown in FIG. 3, assuming that tracking areas TA1 and TA2 are physically adjacent to each other, priority information needs to be specified in the tracking area TA1, and priority information need not be specified in the tracking area TA2. When the user equipment terminal $100_n$ enters the tracking area TA2 from the tracking area TA1 and transmits a TAU, the network (network node) transmits a TAUA without including priority information in response to the TAU. When the user equipment terminal $100_n$ receives the TAUA without including priority information, the user equipment terminal $100_n$ discards the priority information (priority information of the tracking area TA1) which has been maintained by the user equipment terminal $100_n$. While FIG. 3 shows the example where the cell in the frequency layer is a cellular cell, a cell in at least one frequency layer may be a hot-spot cell.

Next, the user equipment terminal $100_n$ in accordance with this embodiment is described with reference to FIG. 4.

The user equipment terminal $100_n$ includes an RF circuit 102, a broadcast channel receiving unit 104, a control plane processing unit 106 as a determining unit, a user plane processing unit 108, a user interface (I/F) 110, a reception quality measuring unit 112, a threshold determining unit 118, a control unit 120, and a cell selecting unit 122. The reception quality measuring unit 112 includes a serving cell reception quality measuring unit 114 and a neighbor cell reception quality measuring unit 116.

A signal included in a broadcast channel transmitted from the base station apparatus 200 is input via the RF circuit 102 to the broadcast channel receiving unit 104. This signal includes a threshold ($S_{search}$) of propagation quality in the serving cell, hysteresis ($Q_{hyst}$) of propagation quality, and an offset ($Q_{offset}$) of reception quality. The threshold of propagation quality in the serving cell may include plural kinds of thresholds. For example, the threshold may include a threshold (hereinafter referred to as a same frequency measurement threshold ($S_{intra\_search}$)) for performing cell search in the same frequency layer, a threshold (hereinafter referred to as a different frequency measurement threshold ($S_{inter\_search}$)) for performing cell search in a different frequency layer, and a threshold (hereinafter referred to as an other-RAT measurement threshold ($S_{search\_RAT}$)) for performing cell search in a different RAT, when propagation quality in the serving cell is less than each of the thresholds. While the different frequency measurement threshold ($S_{inter\_search}$) is used in this embodiment, the same frequency measurement threshold ($S_{intra\_search}$) and the other-RAT measurement threshold ($S_{search\_RAT}$) may be similarly used.

The broadcast channel receiving unit 104 extracts the threshold ($S_{search}$) of propagation quality in the serving cell, the hysteresis ($Q_{hyst}$) of propagation quality, and the offset ($Q_{offset}$) of reception quality from the broadcast channel. The broadcast channel receiving unit 104 inputs the threshold ($S_{search}$) of propagation quality in the serving cell to the threshold determining unit 118 and inputs the hysteresis ($Q_{hyst}$) of propagation quality and the offset ($Q_{offset}$) of reception quality to the cell selecting unit 122.

The serving cell reception quality measuring unit 114 measures propagation quality ($Q_s$) in the standby cell and inputs the propagation quality ($Q_s$) to the threshold determining unit 118. The propagation quality may be downlink reference symbol received power (RSRP), Es/Io (energy per symbol to interference density ratio), or downlink reference symbol received power divided by downlink received power (RSRP/RSSI). The definition of downlink reference symbol received power can be found in 3GPP TS36.214, v1.1.0, May, 2007. Alternatively, at least one of RSRP, Es/Io, and RSRP/RSSI may be measured as the propagation quality in the serving cell. Further, any other value representing the propagation quality may be used.

The threshold determining unit 118 determines whether the propagation quality input from the serving cell reception quality measuring unit 114 is less than the threshold ($S_{search}$) of propagation quality in the serving cell input from the broadcast channel receiving unit 104, and then inputs the determination result to the control unit 120. Thresholds may be provided for RSRP, Es/Io, and RSRP/RSSI, respectively, and the threshold determining unit 118 may make the determination based on these thresholds.

The neighbor cell reception quality measuring unit 116 periodically performs neighbor cell search and measures propagation quality ($Q_n$) in neighbor cells (adjacent cells). The measured value is input to the cell selecting unit 122. Specifically, the control unit 120 inputs a command instructing the RF circuit 102 to change the frequency. When the RF circuit changes the frequency, neighbor cell search is performed.

When the determination result input from the threshold determining unit 118 indicates that the propagation quality in the serving cell is less than the threshold, the control unit 120 queries the cell selecting unit 122 as to whether any cell satisfies the selection criteria (R-criteria).

In response to the query from the control unit 120, when a priority of selecting a standby cell is not specified, the cell selecting unit 122 determines whether any cell satisfies the selection criteria. Specifically, the cell selecting unit 122 determines whether any cell satisfies the following condition for a predetermined period of time (Treselection):

> (propagation quality ($Q_s$) in the serving cell)+(hysteresis ($Q_{hyst}$) of propagation quality)<(propagation quality ($Q_n$) in the neighbor cell)+(offset ($Q_{offset}$) of propagation quality).

The determination based on addition of the hysteresis ($Q_{hyst}$) of propagation quality can avoid fluctuations in cell selection. The cell selecting unit 122 notifies the control unit 120 of the result of cell selection. When the result of cell selection includes information about a cell which satisfies the selection criteria, the control unit performs cell reselection to select the cell. For example, the control unit 120 sets the frequency or the like. More specifically, the control unit 120 sets the frequency of the RF circuit 102 according to the information about the cell input from the cell selecting unit 122 and notifies the control plane processing unit 106 of the bandwidth or the like. When the result of cell selection does not include information about a cell which satisfies the selection criteria, the control unit 120 instructs the serving cell reception quality measuring unit 114 to measure propagation quality.

In addition, in response to the query from the control unit 120, when a priority of selecting a standby cell is specified and the user equipment terminal is in the standby status in a cell with a higher priority, the cell selecting unit 122 determines whether propagation quality ($Q_s$) in the serving cell satisfies minimum required propagation quality. When the propagation quality ($Q_s$) in the serving cell satisfies the minimum required propagation quality, the cell selecting unit 122 notifies the control unit 120 that the propagation quality ($Q_s$) in the serving cell satisfies the minimum required propagation quality. When the control unit 120 is notified that the propagation quality ($Q_s$) in the serving cell satisfies the minimum required propagation quality, the control unit 120 instructs the serving cell reception quality measuring unit 114 to measure propagation quality. When the propagation quality ($Q_s$) in the serving cell does not satisfy the minimum required propagation quality, the cell selecting unit 122 determines whether propagation quality ($Q_n$) in the neighbor cell satisfies the minimum required propagation quality. When the propagation quality ($Q_n$) in the neighbor cell does not satisfy the minimum required propagation quality, the cell selecting unit 122 notifies the control unit 120 that the propagation quality ($Q_n$) in the neighbor cell does not satisfy the minimum required propagation quality. When the control unit 120 is notified that the propagation quality ($Q_n$) in the neighbor cell does not satisfy the minimum required propagation quality, the control unit 120 instructs the serving cell reception quality measuring unit 114 to measure propagation quality. On the other hand, when the propagation quality ($Q_n$) in the neighbor cell satisfies the minimum required propagation quality, the cell selecting unit 122 notifies the control unit 120 that the propagation quality ($Q_n$) in the neighbor cell satisfies the minimum required propagation quality. When the control unit 120 is notified that the propagation quality ($Q_n$) in the neighbor cell satisfies the minimum required propagation quality, the control unit 120 selects the neighbor cell. For example, the control unit 120 sets the frequency or the like. More specifically, the control unit 120 sets the frequency of the RF circuit 102 according to information about the cell input from the cell selecting unit 122 and notifies the control plane processing unit 106 of the bandwidth or the like.

In addition, in response to the query from the control unit 120, when a priority of selecting a standby cell is specified and the user equipment terminal is in the standby status in a cell with a lower priority, the cell selecting unit 122 determines whether propagation quality ($Q_n$) in the neighbor cell satisfies the minimum required propagation quality plus hysteresis. When the propagation quality ($Q_n$) in the neighbor cell is less than or equal to the minimum required propagation quality plus hysteresis, the cell selecting unit 122 notifies the control unit 120 that the propagation quality ($Q_n$) in the neighbor cell does not satisfy the minimum required propagation quality plus hysteresis. When the control unit 120 is notified that the propagation quality ($Q_n$) in the neighbor cell is less than or equal to the minimum required propagation quality plus hysteresis, the control unit 120 instructs the serving cell reception quality measuring unit 114 to measure propagation quality. On the other hand, when the propagation quality ($Q_n$) in the neighbor cell is more than the minimum required propagation quality plus hysteresis, the cell selecting unit 122 notifies the control unit 120 that the propagation quality ($Q_n$) in the neighbor cell satisfies the minimum required propagation quality plus hysteresis. When the control unit 120 is notified that the propagation quality ($Q_n$) in the neighbor cell satisfies the minimum required propagation quality plus hysteresis, the control unit 120 selects the neighbor cell. For example, the control unit 120 sets the frequency or the like. More specifically, the control unit 120 sets the frequency of the RF circuit 102 according to information about the cell input from the cell selecting unit 122 and notifies the control plane processing unit 106 of the bandwidth or the like.

The broadcast channel receiving unit 104 inputs to the control plane processing unit 106 information other than the threshold ($S_{search}$) of propagation quality in the serving cell, hysteresis ($Q_{hyst}$) of propagation quality, and an offset ($Q_{offset}$) of reception quality. For example, the broadcast channel receiving unit 104 inputs a TAUA (tracking area update accept) to the control plane processing unit 106.

When the input TAUA includes priority information, the control plane processing unit 106 inputs the priority information to the cell selecting unit 122. When the input TAUA does not include priority information, the control plane processing unit 106 inputs to the cell selecting unit 122 an instruction for discarding priority information. Alternatively, the control plane processing unit 106 may input to the cell selecting unit 122 priority information having the same priority to be used for frequency layers.

The user plane processing unit 108 performs processes according to the control plane processing unit 106 and transmits transmission data via the. RF circuit 102. In addition, the user plane processing unit 108 receives reception data via the RF circuit 102.

Figure 5:
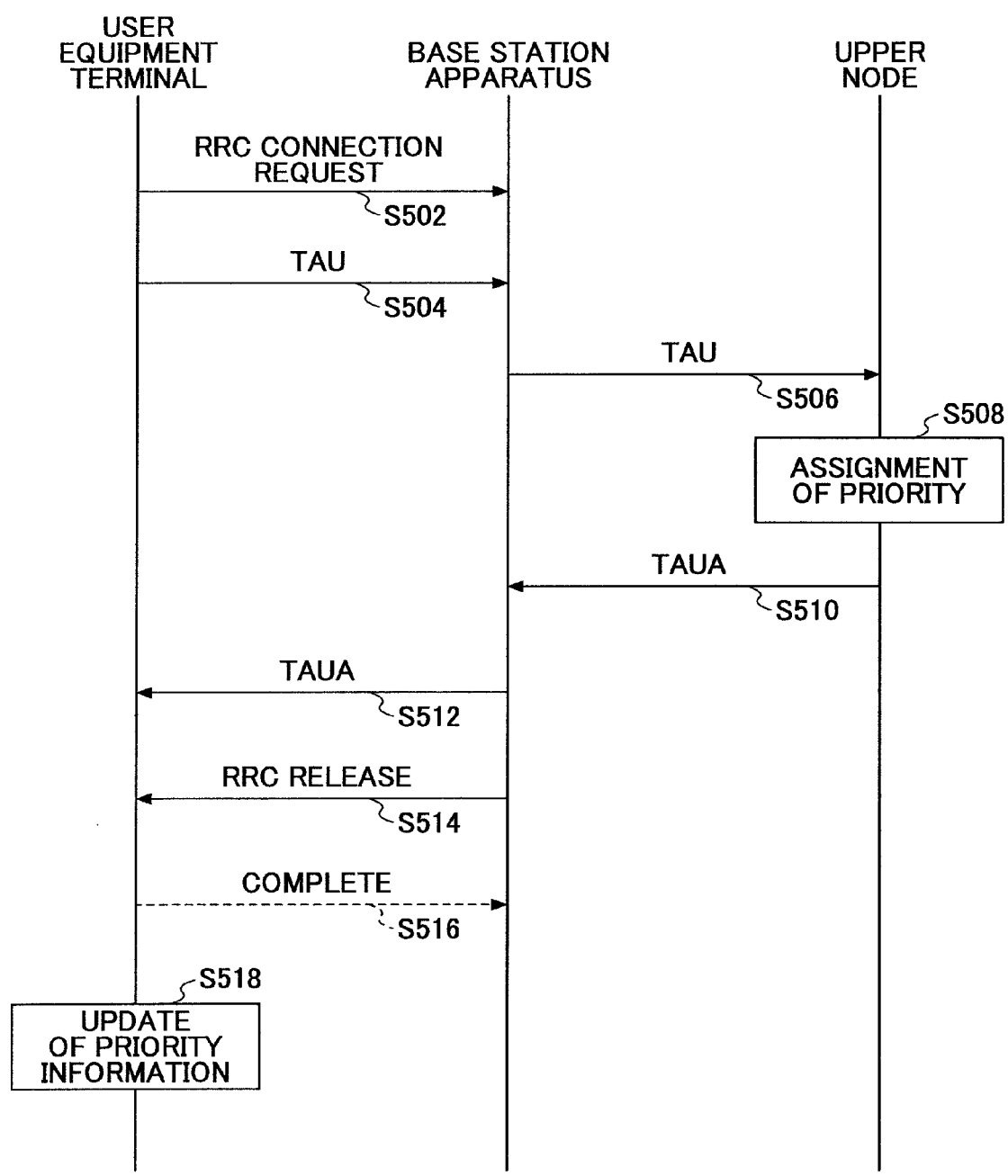
FIG. 5 shows a sequence diagram of a procedure of reporting priority information in accordance with an embodiment of the present invention.

Next, a procedure of reporting priority information in accordance with this embodiment is described with reference to FIG. 5.

The user equipment terminal $100_n$ transmits an RRC (radio resource control) connection request (step S502).

The user equipment terminal $100_n$ transmits a TAU (step S504). The TAU is transmitted via the base station apparatus $200_i$ to the upper node such as the MME (step S506). The MME associates the tracking area with the user equipment terminal $100_n$ based on the TAU transmitted from the user equipment terminal $100_n$. The MME also assigns a priority of selecting a standby cell to the user equipment terminal $100_n$ (step S508).

The MME transmits the ID of the tracking area associated with the user equipment terminal $100_n$ along with a message called a TAUA (step S510). When a priority is specified, the TAUA includes priority information. Otherwise, the TAUA does not include priority information. For example, the priority information may be specified as optional information. In this case, when there is no optional information, the priority information is not specified. In this manner, since no optional information means that no priority information is specified, the amount of information to be transmitted can be reduced when the priority is not specified, compared with the case where priority information having the same priority is transmitted.

The TAUA is reported via the base station apparatus $200_i$ to the user equipment terminal $100_n$ (step S512).

The base station apparatus $200_i$ transmits an RRC release request (RRC release) (step S514). The RRC release request may be also referred to as an RRC connection release message.

The user equipment terminal $100_n$ performs RRC release and reports its completion (step S516). The completion may not be reported.

The user equipment terminal $100_n$ updates priority information based on the TAUA (step S518). When priority information is not included in the TAUA, the user equipment terminal $100_n$ discards the priority information which has been maintained by the user equipment terminal $100_n$. In other words, the priority in each of the frequency layers is set to be the same priority.

Figure 6:
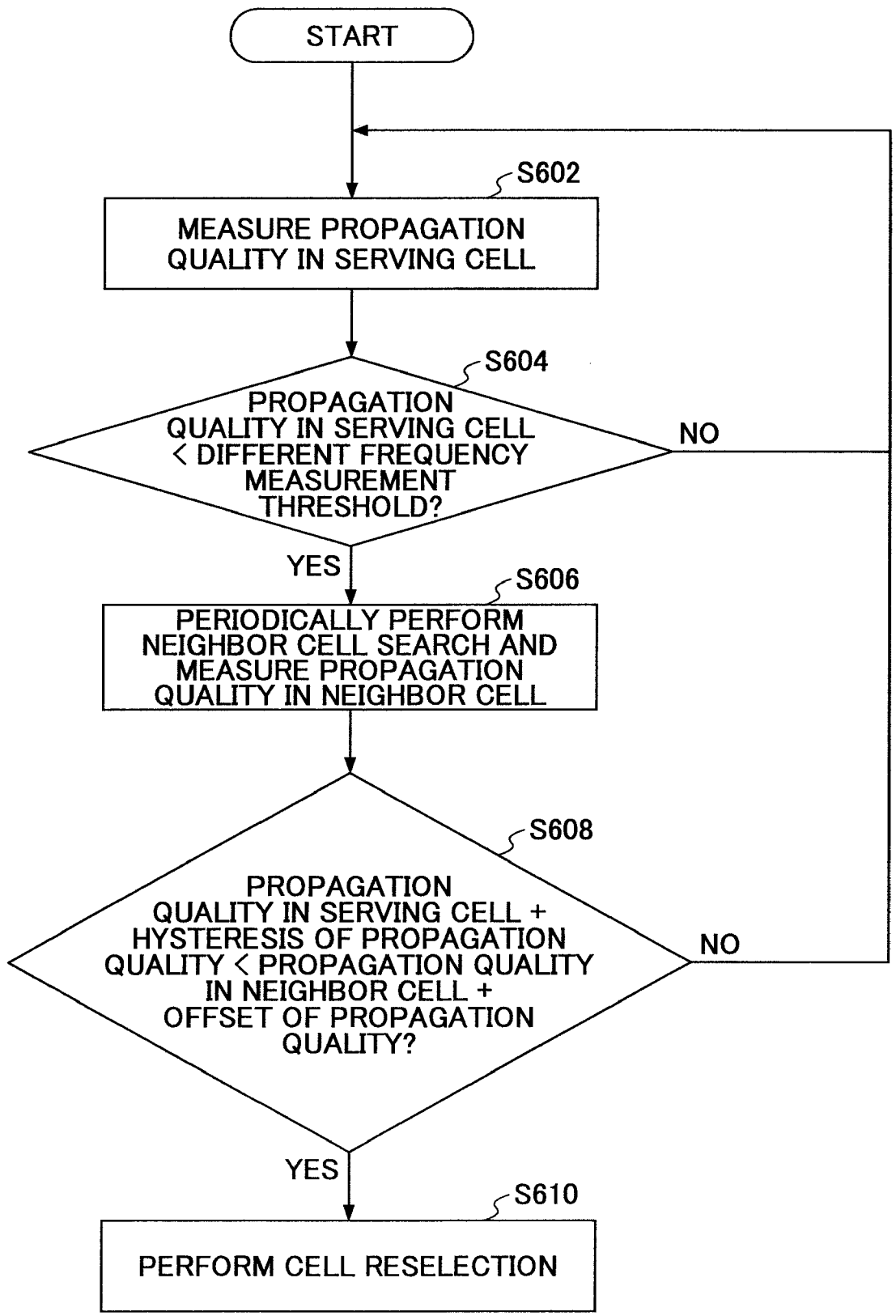
FIG. 6 shows a flowchart of an operation in a user equipment terminal in accordance with an embodiment of the present invention.

Next, an operation in the user equipment terminal $100_n$ when priority information is not included in the TAUA is described with reference to FIG. 6.

The serving cell reception quality measuring unit 114 measures propagation quality ($Q_s$) in the serving cell (step S602).

The threshold determining unit 118 determines whether the propagation quality ($Q_s$) in the serving cell is less than a threshold of propagation quality in the serving cell (step S604). For example, the propagation quality ($Q_s$) in the serving cell is compared with the different frequency measurement threshold ($S_{inter\_search}$).

When the propagation quality ($Q_s$) in the serving cell is not less than the different frequency measurement threshold ($S_{inter\_search}$) (step S604: NO), the operation returns to step S602.

On the other hand, when the propagation quality ($Q_s$) in the serving cell is less than the different frequency measurement threshold ($S_{inter\_search}$) (step S604: YES), the control unit 120 queries the cell selecting unit 122 as to whether any cell satisfies the selection criteria. The control unit 120 inputs a command instructing the RF circuit 102 to change the frequency, which in turn changes the frequency. The neighbor cell reception quality measuring unit 116 periodically performs neighbor cell search and measures propagation quality in neighbor cells (step S606). In this step, propagation quality is measured both in cells in the frequency layer within which the user equipment terminal $100_n$ is situated and in cells in frequency layers different from the frequency layer.

In response to the query from the control unit 120, the cell selecting unit 122 determines whether any cell satisfies the selection criteria, since the priority of selecting a standby cell is not specified. The phrase "the priority is not specified" means that priority information is not included in the TAUA received by the user equipment terminal $100_n$. In this case, the control plane processing unit 106 inputs to the cell selecting unit 122 an instruction for discarding priority information. Alternatively, the control plane processing unit 106 may input to the cell selecting unit 122 priority information having the same priority to be used for frequency layers.

The cell selecting unit 122 determines whether any cell satisfies the following condition for the predetermined period of time (Treselection) (step S608):

(propagation quality ($Q_s$) in the serving cell)+(hysteresis ($Q_{hyst}$) of propagation quality)<(propagation quality ($Q_n$) in the neighbor cell)+(offset ($Q_{offset}$) of propagation quality).

When no cell satisfies the condition in step S608 (step S608: NO), the operation returns to step S602. On the other hand, when a cell satisfies the condition in step S608 (step S608: YES), the control unit 120 selects the cell (performs cell reselection) (step S610). Cell reselection refers to waiting for a call in the cell.

As described above, when the priority is not specified, the user equipment terminal $100_n$ can wait for a call (can be in the standby status) in a cell with a better radio condition.

Figure 7:
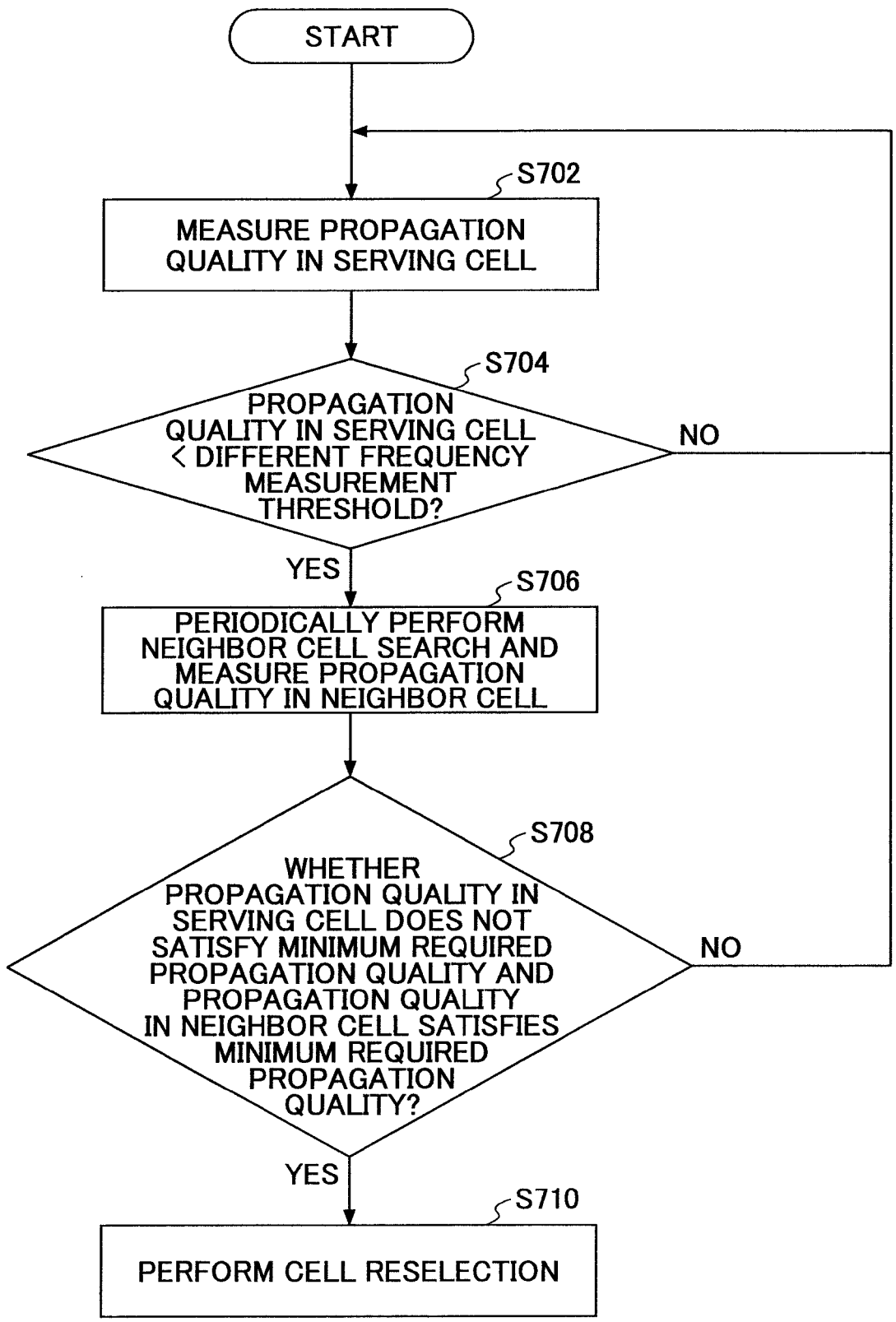
FIG. 7 shows a flowchart of an operation in a user equipment terminal in accordance with an embodiment of the present invention.
Figure 8:
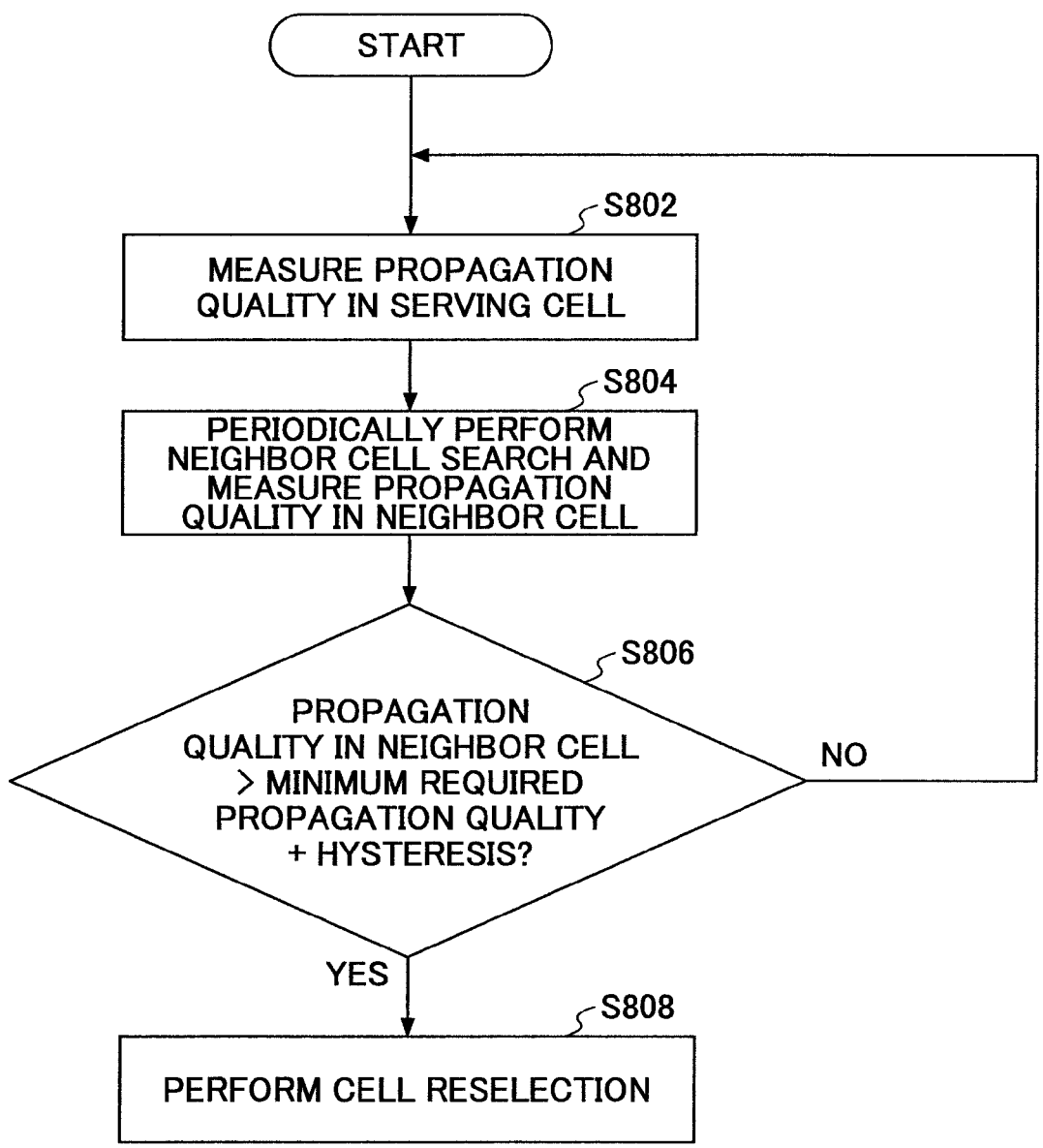
FIG. 8 shows a flowchart of an operation in a user equipment terminal in accordance with an embodiment of the present invention.

Next, an operation of the user equipment terminal $100_n$ when priority information is included in the TAUA is described with reference to FIGS. 7 and 8.

The case where the user equipment terminal $100_n$ is in the standby status in a cell with a high priority (the highest priority) is described with reference to FIG. 7.

The serving cell reception quality measuring unit 114 measures propagation quality ($Q_s$) in the serving cell (step S702).

The threshold determining unit 118 determines whether the propagation quality ($Q_s$) in the serving cell is less than a threshold of propagation quality in the serving cell (step S704). For example, the propagation quality ($Q_s$) in the serving cell is compared with the different frequency measurement threshold ($S_{inter\_search}$).

When the propagation quality ($Q_s$) in the serving cell is not less than the different frequency measurement threshold ($S_{inter\_search}$) (step S704: NO), the operation returns to step S702.

On the other hand, when the propagation quality ($Q_s$) in the serving cell is less than the different frequency measurement threshold ($S_{inter\_search}$) (step S704: YES), the control unit 120 queries the cell selecting unit 122 as to whether any cell satisfies the selection criteria. The control unit 120 inputs a command instructing the RF circuit 102 to change the frequency, which in turn changes the frequency. The neighbor cell reception quality measuring unit 116 periodically performs neighbor cell search and measures propagation quality in neighbor cells (step S706).

In response to the query from the control unit 120, the cell selecting unit 122 determines whether the propagation quality in the serving cell does not satisfy the minimum required propagation quality and propagation quality in any neighbor cell satisfies the minimum required propagation quality, since the priority is specified and the user equipment terminal $100_n$ is situated within the cell with the highest priority (step S708). In other words, since the user equipment terminal $100_n$ is situated within the cell with the highest priority, cell reselection is not performed as long as the propagation quality in the serving cell satisfies the minimum required propagation quality.

When no cell satisfies the condition in step S708 (step S708: NO), the operation returns to step S702. On the other hand, when a cell satisfies the condition in step S708 (step S708: YES), the control unit 120 selects the cell (performs cell reselection) (step S710). Cell reselection refers to waiting for a call in the cell.

The case where the user equipment terminal $100_n$ is not in the standby status in a cell with the highest priority is described with reference to FIG. 8.

The serving cell reception quality measuring unit 114 measures propagation quality ($Q_s$) in the serving cell (step S802).

The control unit 120 inputs a command instructing the RF circuit 102 to change the frequency, which in turn changes the frequency. The neighbor cell reception quality measuring unit 116 periodically performs neighbor cell search and measures propagation quality in neighbor cells (step S804). In this step, the user equipment terminal $100_n$ measures propagation quality both in cells in the frequency layer within which the user equipment terminal $100_n$ is situated and in cells in frequency layers different from the frequency layer. The order in which propagation quality in a cell is measured is based on the priority of the frequency layer including the cell.

The cell selecting unit 122 determines whether propagation quality in the neighbor cell exceeds the minimum required propagation quality in the neighbor cell plus hysteresis (step S806).

When no neighbor cell does not exceed the minimum required propagation quality in the neighbor cell plus hysteresis (step S806: NO), the operation returns to step S802. On the other hand, when a cell satisfies the condition in step S806 (step S806: YES), the control unit 120 selects the cell (performs cell reselection) (step S808). Cell reselection refers to waiting for a call in the cell.

Next, a radio communication system in accordance with a second embodiment is described below.

Figure 2:
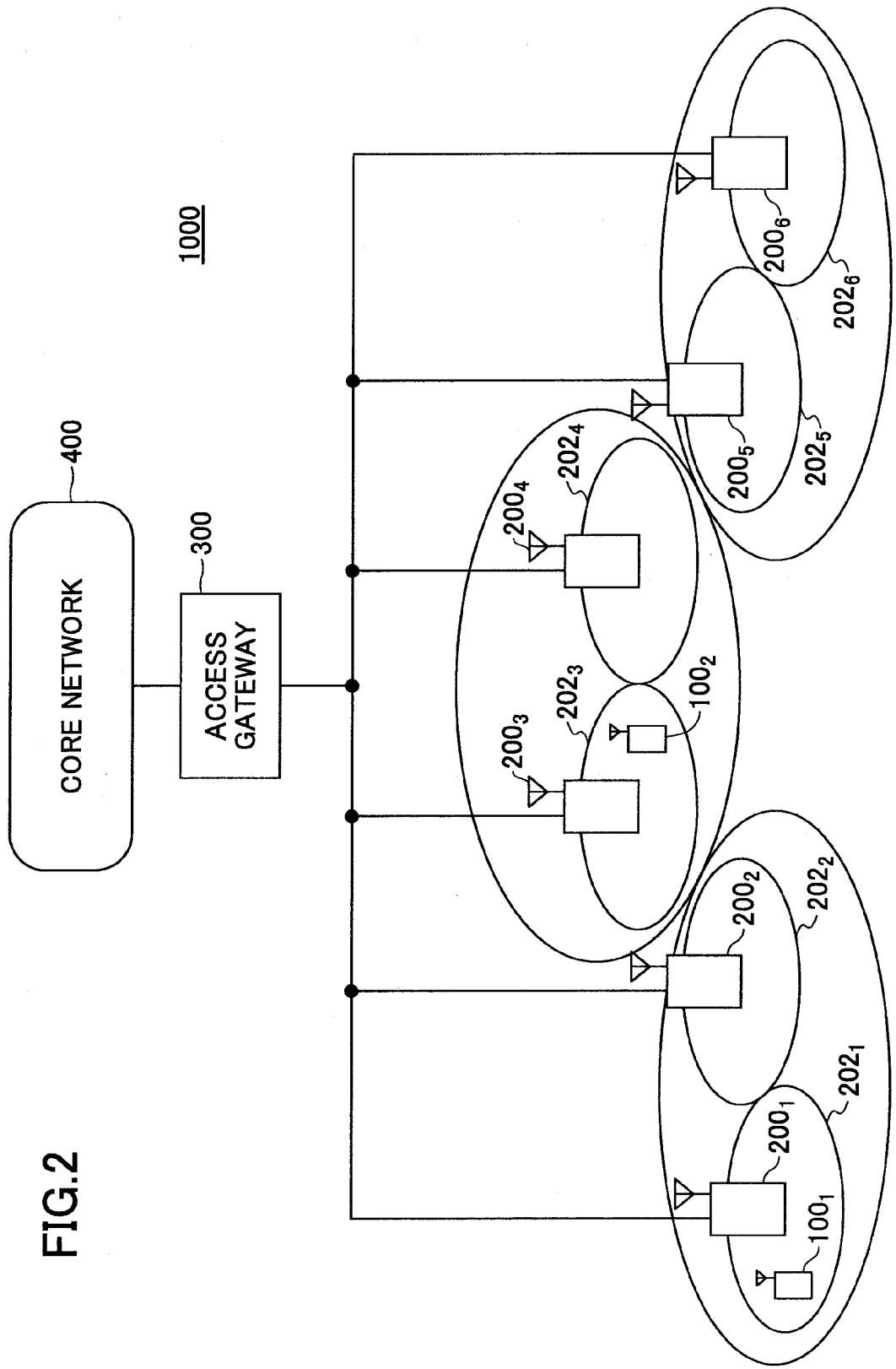
FIG. 2 shows a conceptual diagram illustrating a radio communication system in accordance with an embodiment of the present invention.
Figure 4:
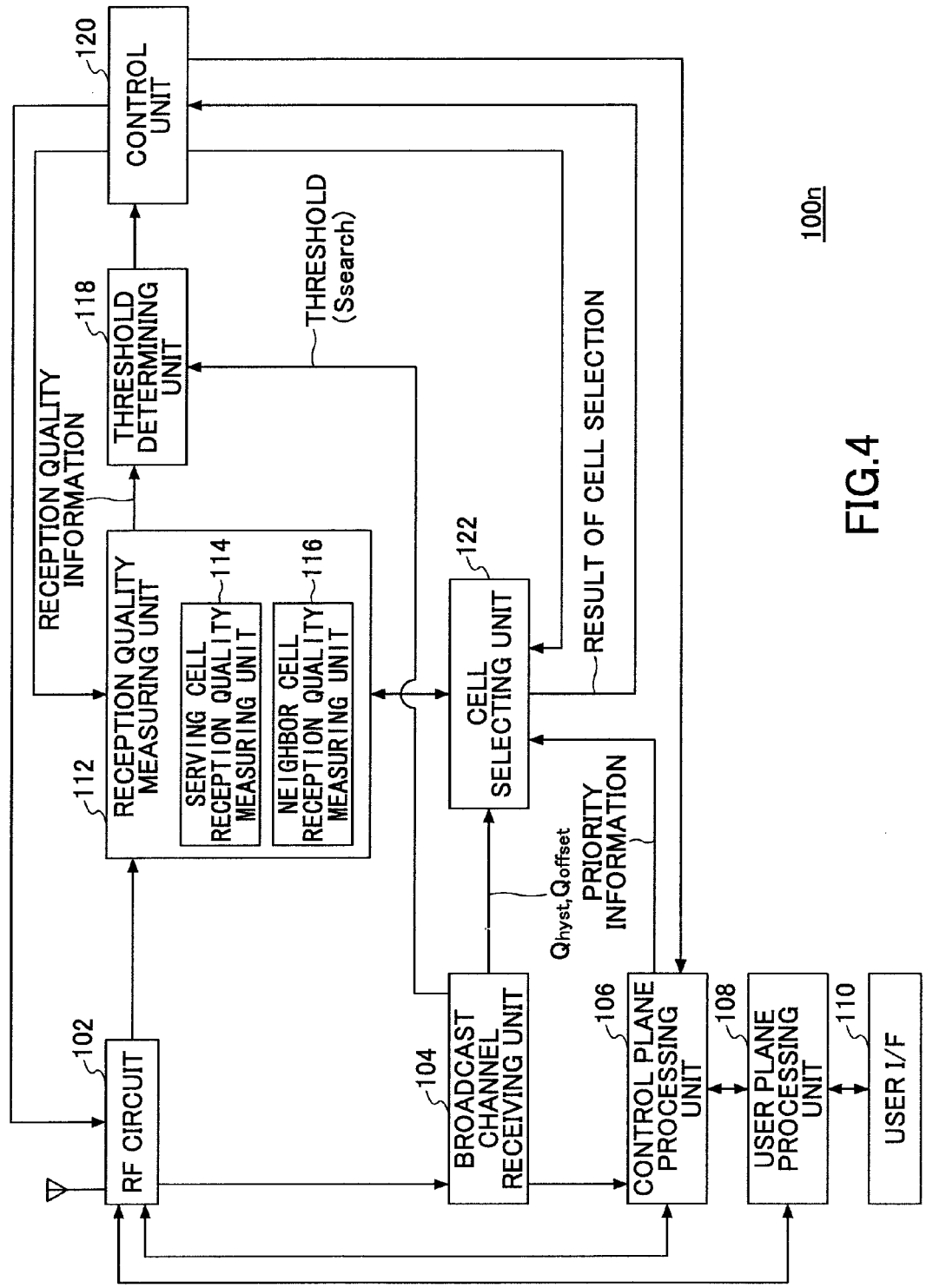
FIG. 4 shows a partial block diagram of a user equipment terminal in accordance with an embodiment of the present invention.

The configuration of the radio communication system and the configuration of the user equipment terminal in accordance with the third embodiment are the same as those shown in FIGS. 2 and 4, respectively.

Figure 9:
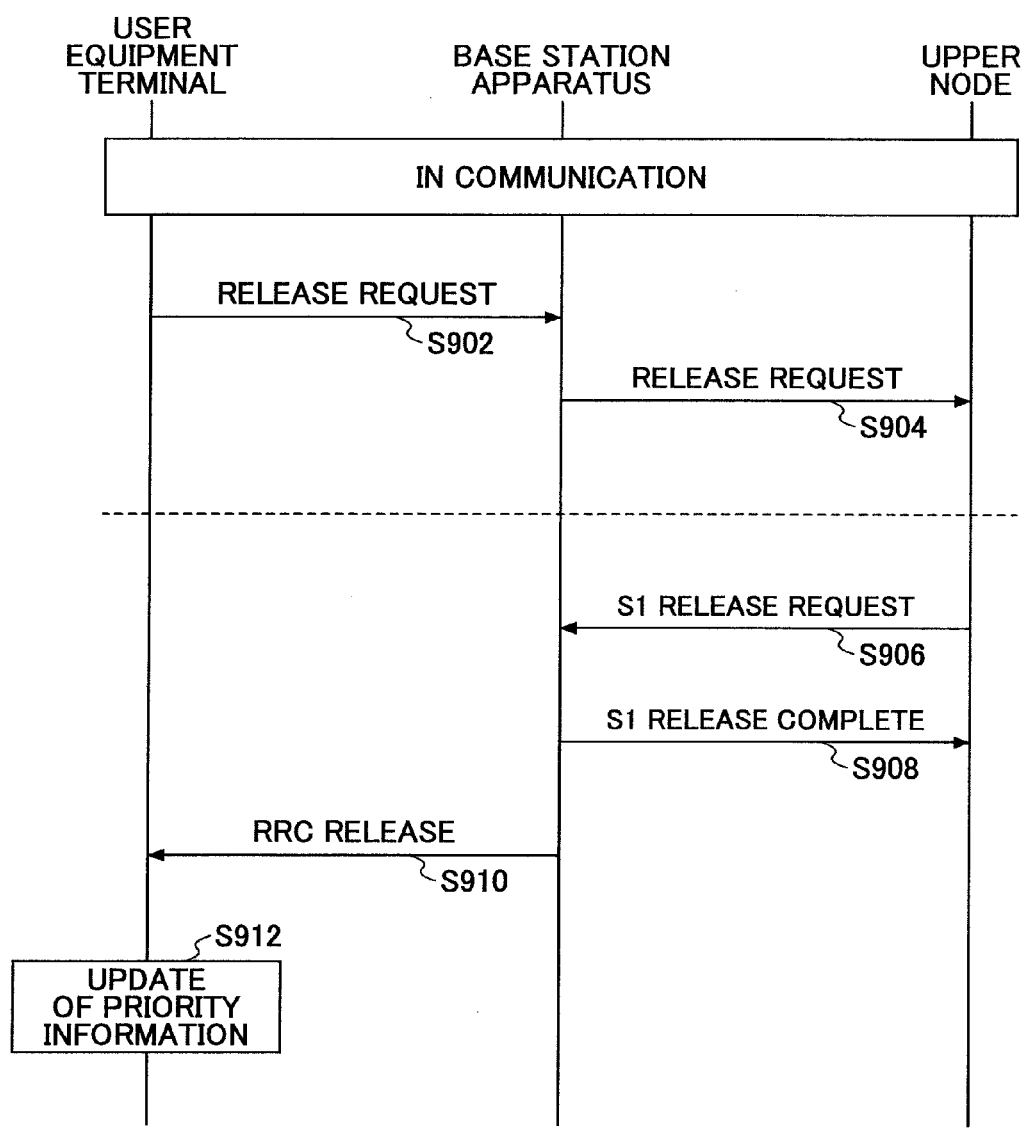
FIG. 9 shows a sequence diagram of a procedure of reporting priority information in accordance with an embodiment of the present invention.

In the first embodiment, when a TAUA in response to a TAU does not include priority information, priority information which has been maintained by the user equipment terminal 100, is discarded. In the second embodiment, an RRC release request (RRC release) includes priority information. According to the second embodiment, the priority of the standby cell can be released upon termination of a call. As a result, the user equipment terminal $100_n$ can wait for a call (can be in the standby status) in a cell with a better radio condition. A procedure of reporting priority information in the second embodiment is described with reference to FIG. 9.

When communications are to be terminated, operations for terminating the call are input to the user equipment terminal $100_n$. The user equipment terminal $100_n$ transmits a release request based on the operations for terminating the call (step S902). The release request is transmitted via the base station apparatus $200_l$ to the upper node (step S904).

In response to the release request transmitted from the user equipment terminal $100_n$, the upper node transmits an S1 release request (step S906). In this embodiment, the upper node transmits the S1 release request including priority information. As used herein, S1 means an interface between the upper node and the base station apparatus $200_l$.

In response to the S1 release request, the base station apparatus $200_l$ releases the S1 and transmits an S1 release complete to the upper node (step S908).

Then, the base station apparatus $200_l$ includes priority information, which is included in the S1 release request, in an RRC release request (RRC release) and transmits the RRC release request to the user equipment terminal $100_n$ (step S910).

The user equipment terminal $100_n$ updates priority information based on the priority information included in the RRC release request (step S912). When priority information is not included in the RRC release request, the user equipment terminal $100_n$ discards the priority information which has been maintained by the user equipment terminal $100_n$. In other words, the priority in each of the frequency layers is set to be the same priority.

For example, the broadcast channel receiving unit 104 inputs the RRC release request to the control plane processing unit 106.

When the input RRC release request includes priority information, the control plane processing unit 106 inputs the priority information to the cell selecting unit 122. When the input RRC release request does not include priority information, the control plane processing unit 106 inputs to the cell selecting unit 122 an instruction for discarding priority information. Alternatively, the control plane processing unit 106 may input to the cell selecting unit 122 priority information having the same priority to be used for frequency layers.

Next, a radio communication system in accordance with a third embodiment is described below.

The configuration of the radio communication system and the configuration of the user equipment terminal in accordance with the third embodiment are the same as those shown in FIGS. 2 and 4, respectively.

In the first embodiment, priority information is assigned by the upper node. In the third embodiment, priority information may be assigned by the base station apparatus $200_l$.

Figure 10:
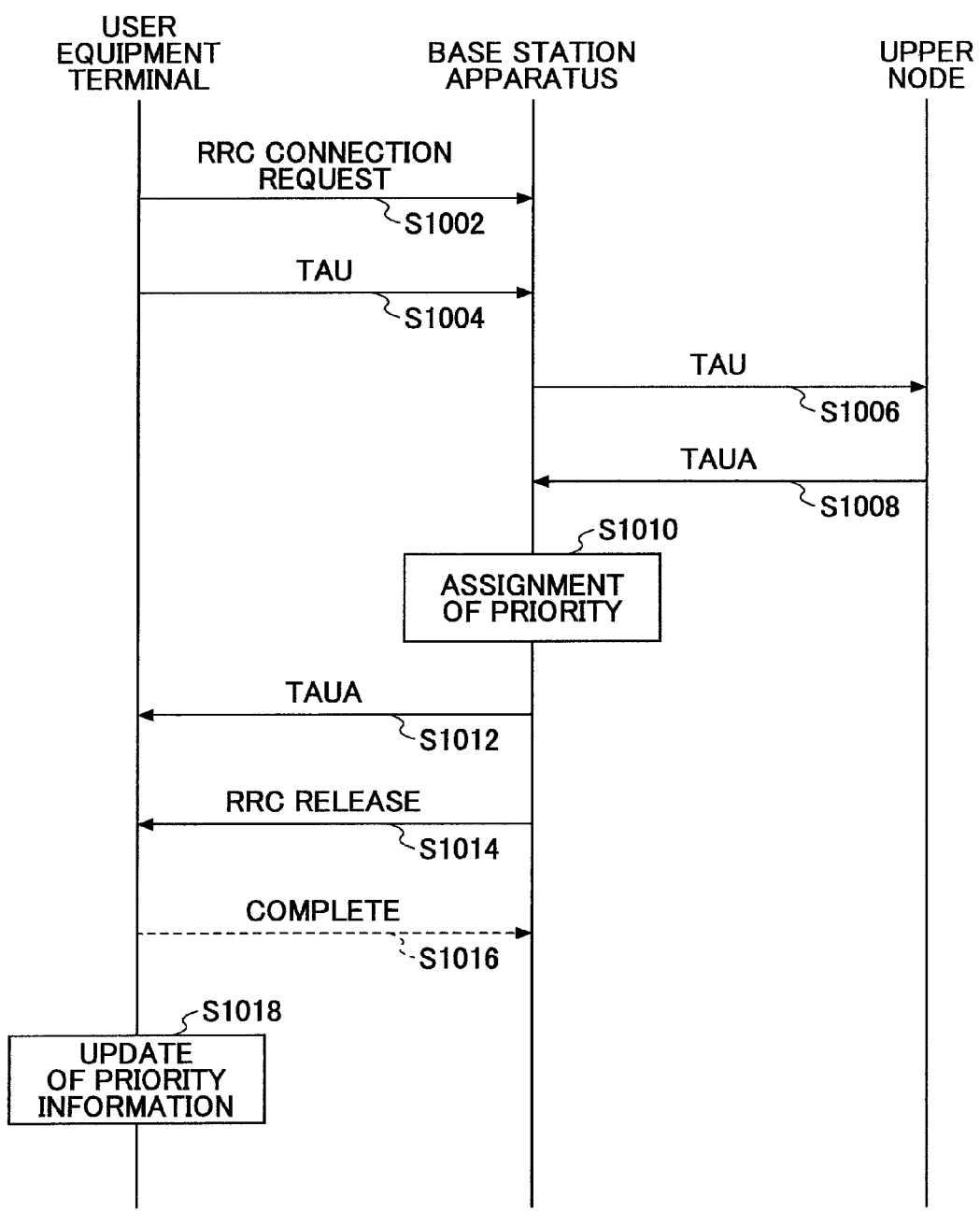
FIG. 10 shows a sequence diagram of a procedure of reporting priority information in accordance with an embodiment of the present invention.

A procedure of reporting a priority in accordance with the third embodiment is described with reference to FIG. 10.

The user equipment terminal $100_n$ transmits an RRC connection request (step S1002).

The user equipment terminal $100_n$ transmits a TAU (step S1004). The TAU is transmitted via the base station apparatus $200_l$ to the upper node such as the MME (step S1006). The MME associates the tracking area with the user equipment terminal 100, based on the TAU transmitted from the user equipment terminal $100_n$. The MME transmits the ID of the tracking area associated with the user equipment terminal $100_n$ along with a message called a TAUA (step S1008).

When a priority to be used by the user equipment terminal $100_n$ is specified, the base station apparatus $200_l$ assigns the priority (step S1010).

The base station apparatus $200_l$ transmits to the user equipment terminal $100_n$ the TAUA which is transmitted from the upper node (step S1012).

The base station apparatus $200_l$ includes the assigned priority information in an RRC release request (RRC release) and transmits the RRC release request to the user equipment terminal 100, (step S1014). When the priority is specified, the RRC release request includes priority information. Otherwise, the RRC release request does not include priority information. For example, the priority information may be specified as optional information. In this case, no optional information means that no priority information is specified.

The user equipment terminal $100_n$ performs RRC release and reports its completion (step S1016). The completion may not be reported.

The user equipment terminal $100_n$ updates priority information based on the priority information included in the RRC release request (step S1018). When priority information is not included in the RRC release request, the user equipment terminal $100_n$ discards the priority information which has been maintained by the user equipment terminal $100_n$. In other words, the priority in each of the frequency layers is set to be the same priority.

For example, the broadcast channel receiving unit 104 inputs the RRC release request to the control plane processing unit 106.

When the input RRC release request includes priority information, the control plane processing unit 106 inputs the priority information to the cell selecting unit 122. When the input RRC release request does not include priority information, the control plane processing unit 106 inputs to the cell selecting unit 122 an instruction for discarding priority information. Alternatively, the control plane processing unit 106 may input to the cell selecting unit 122 priority information having the same priority to be used for frequency layers.

Next, a radio communication system in accordance with a fourth embodiment is described below.

The configuration of the radio communication system and the configuration of the user equipment terminal in accordance with the fourth embodiment are the same as those shown in FIGS. 2 and 4, respectively.

The fourth embodiment differs from the first embodiment in that a TAUA includes priority information, and in that the user equipment terminal $100_n$ which is in the standby status in a standby cell with a high priority (the user equipment terminal waiting for a call in a standby cell with the highest priority) operates differently. In the first embodiment, when a TAUA includes priority information and the user equipment terminal $100_n$ is in the standby status in a standby cell with a higher priority (the highest priority), the user equipment terminal $100_n$ determines whether propagation quality in the serving cell does not satisfy the minimum required propagation quality and propagation quality in any neighbor cell satisfies the minimum required propagation quality.

In the fourth embodiment, when a TAUA includes priority information and the user equipment terminal $100_n$ is in the standby status in a standby cell with a higher priority (the highest priority), the user equipment terminal $100_n$ determines whether propagation quality in the serving cell does not satisfy the minimum required propagation quality, propagation quality in any neighbor cell of the same frequency does not satisfy the minimum required propagation quality, and propagation quality in any neighbor cell of a different frequency satisfies the minimum required propagation quality. Neighbor cells of the same frequency mean cells in the same frequency layer other than the cell within which the user equipment terminal $100_n$ is situated. Neighbor cells of a different frequency mean cells in a frequency layer different from the frequency layer including the cell within which the user equipment terminal is situated.

Figure 11:
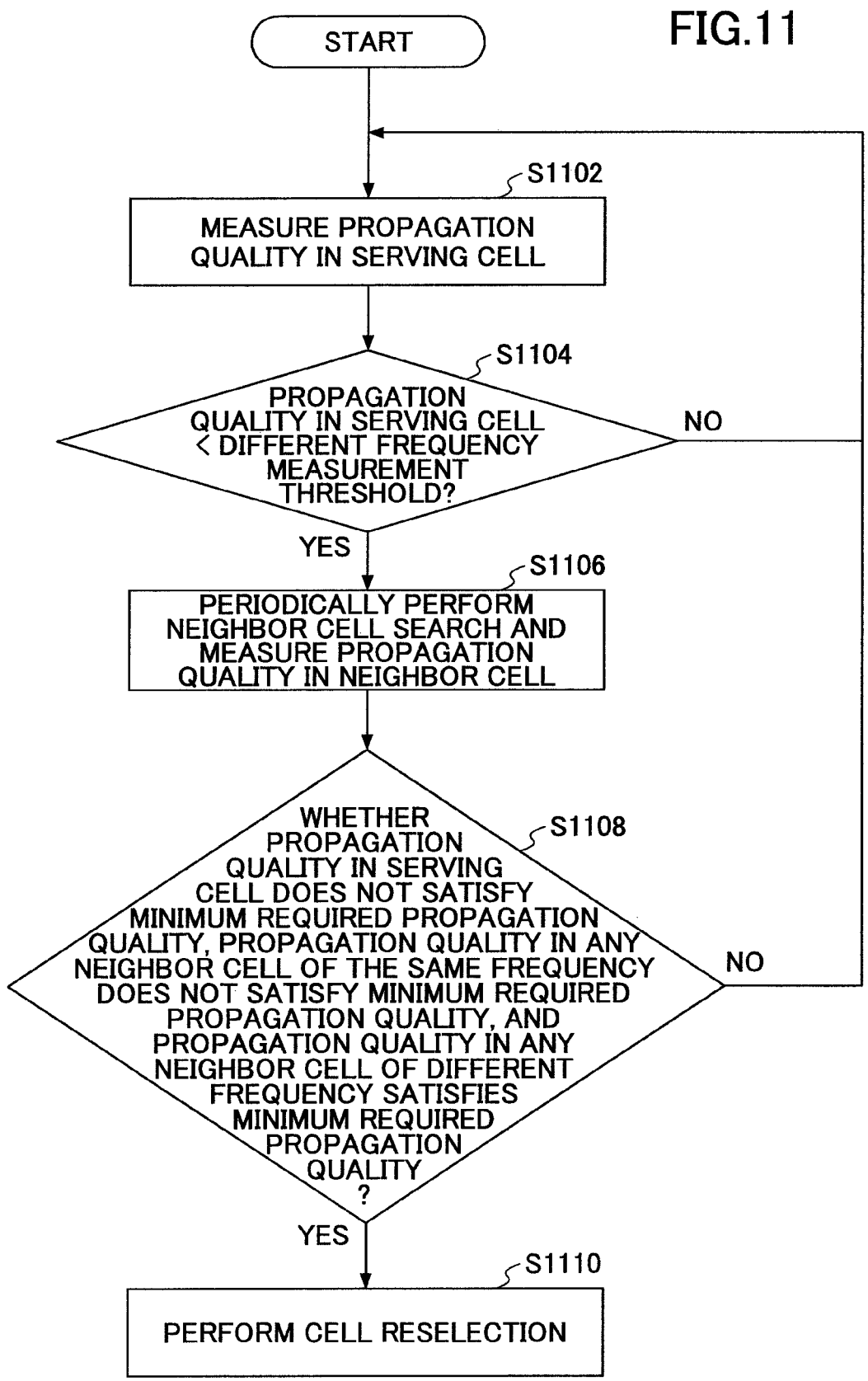
FIG. 11 shows a flowchart of an operation in a user equipment terminal in accordance with an embodiment of the present invention.

An operation of the user equipment terminal $100_n$ is described with reference to FIG. 11.

The user equipment terminal $100_n$ is in the standby status in a cell with a high priority (the highest priority).

The serving cell reception quality measuring unit 114 measures propagation quality ($Q_s$) in the serving cell (step S1102).

The threshold determining unit 118 determines whether the propagation quality ($Q_s$) in the serving cell is less than a threshold of propagation quality in the serving cell (step S1104). For example, the propagation quality ($Q_s$) in the serving cell is compared with the different frequency measurement threshold ($S_{inter\_search}$).

When the propagation quality ($Q_s$) in the serving cell is not less than the different frequency measurement threshold ($S_{inter\_search}$) (step S1104: NO), the operation returns to step S1102.

On the other hand, when the propagation quality ($Q_s$) in the serving cell is less than the different frequency measurement threshold ($S_{inter\_search}$) (step S1104: YES), the control unit 120 queries the cell selecting unit 122 as to whether any cell satisfies the selection criteria. The control unit 120 inputs a command instructing the RF circuit 102 to change the frequency, which in turn changes the frequency. The neighbor cell reception quality measuring unit 116 periodically performs neighbor cell search and measures propagation quality in neighbor cells (step S1106).

In response to the query from the control unit 120, the cell selecting unit 122 determines whether the propagation quality in the serving cell does not satisfy the minimum required propagation quality, propagation quality in any neighbor cell of the same frequency does not satisfy the minimum required propagation quality, and propagation quality in any neighbor cell of a different frequency satisfies the minimum required propagation quality, since the priority is specified and the user equipment terminal $100_n$ is situated within the cell with the highest priority (step S1108). In other words, since the user equipment terminal $100_n$ is situated within the cell with the highest priority, cell reselection is not performed as long as the propagation quality in the serving cell satisfies the minimum required propagation quality. In addition, according to the fourth embodiment, even though propagation quality in a cell satisfies the minimum required propagation quality, cell reselection is not performed if the cell is included in the frequency layer in which the user equipment terminal $100_n$ is situated.

When no cell satisfies the condition in step S1108 (step S1108: NO), the operation returns to step S1102. On the other hand, when a cell satisfies the condition in step S1108 (step S1108: YES), the control unit 120 selects the cell (performs cell reselection) (step S1110). Cell reselection refers to waiting for a call in the cell.

According to the fourth embodiment, assuming that the propagation quality in the serving cell does not satisfy the minimum required propagation quality, cell reselection is performed only when propagation quality in a cell in a frequency layer different from the frequency layer in which the user equipment terminal $100_n$ is situated satisfies the minimum required propagation quality.

In these embodiments, not only a priority for each layer may be applied to each of the user equipment terminals $100_n$, but also expiration of the priority may be specified.

Alternatively, a priority (common priority) for each layer may be applied to all the user equipment terminals $100_n$. The priority for each layer to be applied to all the user equipment terminals $100_n$ may be fixed or dynamically modified. In the latter case, the priority for each layer to be applied to all the user equipment terminals $100_n$ may be provided as broadcast information. When the priority for each layer to be applied to all the user equipment terminals $100_n$ is provided as broadcast information, a user equipment terminal $100_n$ for which a priority for each layer is not individually specified waits for a call according to the priority for each layer to be applied to all the user equipment terminals $100_n$. In addition, when the priority for each layer to be applied to all the user equipment terminal $100_n$ is provided as broadcast information, a user equipment terminal $100_n$ for which a priority for each layer is individually specified but expired waits for a call according to the priority for each layer to be applied to all the user equipment terminals $100_n$. In this case, frequency layers except for the frequency layer specified by the priority for each layer to be applied to all the user equipment terminals $100_n$ and the frequency layer individually specified by the priority for each layer are excluded from candidates for cell selection.

In addition, in these embodiments, the priority may be reported as signaling from the base station apparatus 200. The signaling may include an RRC release request (RRC release). The RRC release request may be also referred to as an RRC connection release message.

Priority information which is maintained by the user equipment terminal $100_n$ may be discarded when the user equipment terminal $100_n$ receives a signal in response to an RRC connection request. In other words, the priority information may be discarded when a connection is established between the user equipment terminal $100_n$ and the base station apparatus $200_l$.

While the number of frequency layers is equal to three in these embodiments, the present invention is also applicable to the case where the number of frequency layers is either two or four or more.

While these embodiments focus on the radio communication system, which may be an Evolved UTRA and UTRAN system (also as known as a Long Term Evolution system or a super 3G system), a user equipment terminal and a radio communication system in accordance with an embodiment of the present invention may be used in any radio communication system in which a network (network node) transmits information about cell selection corresponding to a priority and cell selection is performed according to the priority. For example, the present invention can be applicable to a UMTS radio communication system, as described above.

While the present invention has been described by using specific values in order to facilitate the understanding of the present invention, those values are merely examples and various values may be used unless otherwise noted.

While the present invention has been explained with reference to specific examples, each example is merely illustrative and a person having ordinary skill will understand various alterations, modifications, substitutions, replacements and the like. While the apparatuses according to the examples of the present invention are explained in the form of the operational block diagrams for simplicity of explanation, such apparatuses may be realized by hardware, software or a combination thereof. The present invention is not limited to the above examples, but includes various alterations, modifications, substitutions, replacements and the like without departing the scope of the present invention.

This international application claims the benefit of the priority date of Japanese Patent Application No. 2007-213148 filed on Aug. 17, 2007, the entire contents of which are herein incorporated hereby by reference.

The invention claimed is:

1. A user equipment terminal for selecting a standby cell based on a specified priority of cell selection, comprising:
a determining unit configured to receive an RRC connection release message transmitted from a base station apparatus and determine whether priority information of cell selection is included in the RRC connection release message; and
a cell selecting unit configured to perform, based on the determination result by the determining unit, cell selection according to the priority information, when the priority information is included,
wherein the determining unit determines whether the priority information of cell selection is included in broadcast information, and
wherein the cell selecting unit performs cell selection according to a priority included in the broadcast information, when the priority is not individually specified for the user equipment terminal.

2. A user equipment terminal for selecting a standby cell based on a specified priority of cell selection, comprising:
a determining unit configured to receive an RRC connection release message transmitted from a base station apparatus and determine whether priority information of cell selection is included in the RRC connection release message; and
a cell selecting unit configured to perform, based on the determination result by the determining unit, cell selection according to the priority information, when the priority information is included,
wherein the priority information includes expiration of the priority information.

3. A radio communication system including a user equipment terminal for selecting a standby cell based on a priority of cell selection specified by a base station apparatus, wherein
the base station apparatus includes a priority setting unit configured to set a priority for each user equipment terminal to set the priority of selecting the standby cell;
a transmitting unit configured to transmit an RRC connection release message including priority information set by the priority setting unit; and the user equipment terminal includes a determining unit configured to determine whether the priority information of cell selection is included in the RRC connection release message; and
a cell selecting unit configured to perform, based on the determination result by the determining unit, cell selection according to the priority information, when the priority information is included,
wherein the cell selecting unit performs cell selection according to a priority included in broadcast information, when the priority is not individually specified for the user equipment terminal.

4. A radio communication system including a user equipment terminal for selecting a standby cell based on a priority of cell selection specified by a base station apparatus, wherein
the base station apparatus includes a priority setting unit configured to set a priority for each user equipment terminal to set the priority of selecting the standby cell;
a transmitting unit configured to transmit an RRC connection release message including priority information set by the priority setting unit; and the user equipment terminal includes a determining unit configured to determine whether the priority information of cell selection is included in the RRC connection release message; and
a cell selecting unit configured to perform, based on the determination result by the determining unit, cell selection according to the priority information, when the priority information is included,
wherein the priority information includes expiration of the priority information.

* * * * *